United States Patent [19]

Ida et al.

[11] 4,317,386
[45] Mar. 2, 1982

[54] MECHANISM FOR LUBRICATING AN OUTPUT PILOT BEARING OF A GEAR TRANSMISSION

[75] Inventors: Shiuichiro Ida; Shoichi Ohshima; Shunichi Hirashima, all of Toyota, Japan

[73] Assignee: Toyota Jidosha Kogyo Kabushiki Kaisha, Toyota, Japan

[21] Appl. No.: 107,857

[22] Filed: Dec. 28, 1979

[30] Foreign Application Priority Data

Oct. 22, 1979 [JP] Japan .............................. 54-135101

[51] Int. Cl.³ .......................................... F16H 57/04
[52] U.S. Cl. .................................. 74/467; 184/11 R; 308/187
[58] Field of Search ................ 74/467, 468, 339, 369, 74/377; 184/6.12, 11 R; 192/113 B; 308/187

[56] References Cited

U.S. PATENT DOCUMENTS

| 2,247,732 | 7/1941 | Paton | 184/6.12 |
| 2,487,350 | 11/1949 | Markland | 184/11 R |
| 2,645,305 | 7/1953 | Roos | 184/11 R |
| 2,797,771 | 7/1957 | Orr | 184/11 R |
| 4,221,279 | 9/1980 | Jones et al. | 184/6.12 |

Primary Examiner—C. J. Husar
Assistant Examiner—Conrad Berman
Attorney, Agent, or Firm—Finnegan, Henderson, Farabow, Garrett & Dunner

[57] ABSTRACT

A gear transmission including a casing containing lubrication oil therein, an input gear rotatably mounted in the casing, an output power shaft being supported at one end thereof in the input gear through an output pilot bearing and being rotatable with respect to the input gear, and a gear piece rigidly secured to and arranged concentrically with the input gear. A bearing lubrication mechanism consisting of a cavity formed in the gear piece and an oil aperture formed in the input gear.

1 Claim, 4 Drawing Figures

MECHANISM FOR LUBRICATING AN OUTPUT PILOT BEARING OF A GEAR TRANSMISSION

BACKGROUND OF THE INVENTION

This invention relates to bearing lubrication of a gear transmission for motor vehicles, and more particularly relates to a mechanism for lubricating output pilot bearings which are used for rotatably supporting an output power shaft with respect to a power input gear.

A power output shaft of a gear transmission is rotatably supported at one end thereof by at least one output pilot bearing disposed in an input gear which is connected to a power input shaft and arranged concentrically to the output power shaft. When the transmission is operated in drive ratios other than direct drive in which the input gear directly engages with the output power shaft, the power output shaft is rotated with respect to the input gear, so that it is necessary to lubricate the output pilot bearing. Roller bearings are generally used as the output pilot bearing.

SUMMARY OF THE INVENTION

An object of the present invention is to provide a new and useful lubrication mechanism of a gear transmission which effectively lubricates output pilot bearings.

Another object of the present invention is to provide a lubrication mechanism of a gear transmission which can be easily manufactured.

A bearing lubrication mechanism of the present invention comprises: a casing containing lubrication oil therein, an input gear rotatably mounted in said casing, an output power shaft being supported at one end thereof in said input gear through an output pilot bearing and being rotatable with respect to said input gear, and a gear piece rigidly secured to and arranged concentrically with said input gear, wherein said gear piece has at least one cavity at the side thereof adjacent to said input gear, said cavity radially extending inwardly from the inner portion of the root cylinder of said gear piece to the position beyond the root cylinder of said input gear, and said input gear having at least one oil aperture which connects between the space defined by said cavity and said output pilot bearing.

According to the present invention, the output pilot bearing is effectively lubricated by means of the oil aperture through which lubrication oil is supplied to said output pilot bearing. It is very easy to manufacture the lubrication mechanism of the present invention, because the oil aperture and the cavity are easily formed by machining before the gear piece is rigidly secured to the input gear.

DESCRIPTION OF A PRIOR ART

Figure 3:
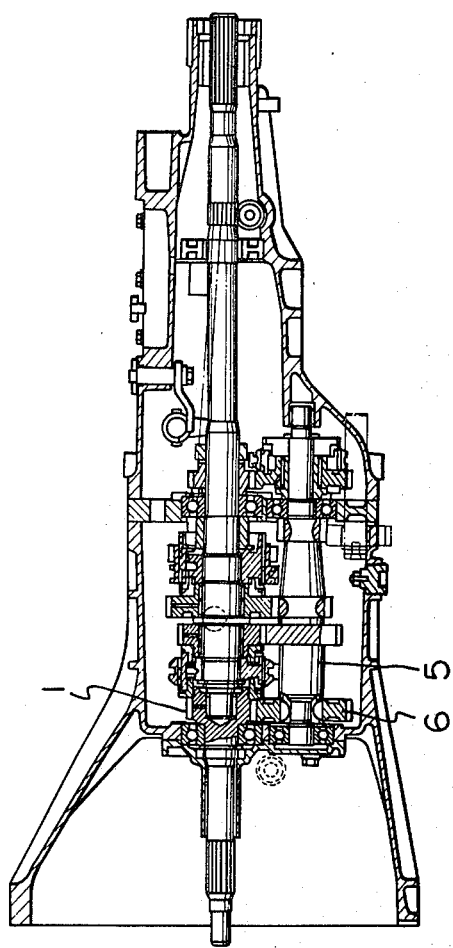
FIG. 3 is a cross-sectional view of a gear transmission for motor vehicles conventionally known in the art; and, FIG. 4 is a cross-sectional view of a conventional lubrication mechanism of an output pilot bearing of a gear transmission.
Figure 4:
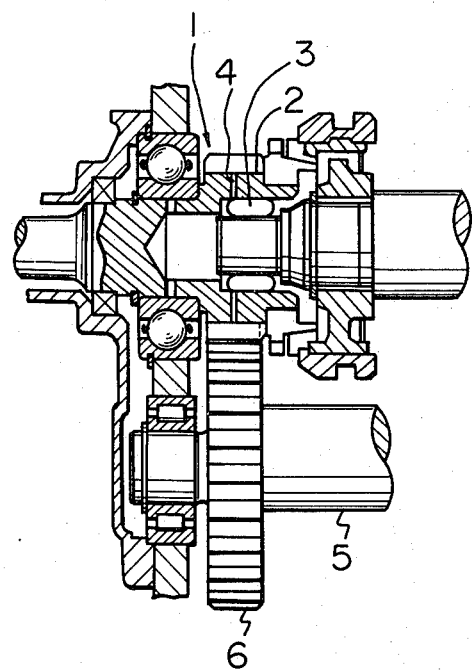

Referring now to FIGS. 3 and 4, an input gear 1 which is connected to a power input shaft has at least one oil aperture 4 which radially extends inwardly from the root cylinder portion 2 of the input gear 1 to the surface contacting an output pilot bearing 3. The input gear, which is in constant meshing engagement with a counter input gear 6 rigidly secured to a counter shaft 5, rotates and supplies lubrication oil to the output pilot bearing 3 from the space between the teeth of the input gear 1 through the oil aperture 4 for lubricating the output pilot bearing 3. According to such a conventional lubrication method, at least one oil aperture 4 must be formed at the root cylinder portion 2 of the input gear 1. It has been, however, difficult to form such an aperture by machining or by other methods. Especially where an input gear which has a small module (pitch diameter/number of teeth) must be used, it is very difficult to insert a machine drill into spaces between the teeth of the input gear and it is almost impossible to form the above mentioned oil apertures.

DESCRIPTION OF A PREFERRED EMBODIMENT

Figure 1:
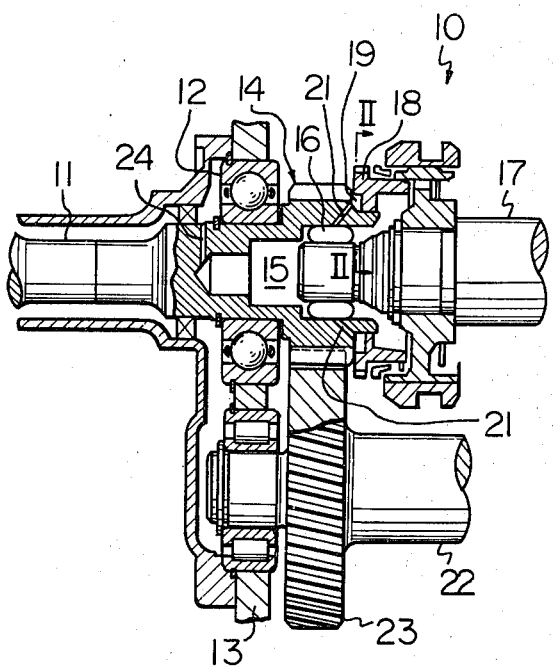
FIG. 1 is a cross-sectional view of a part of a gear transmission for motor vehicles which employs a bearing lubrication mechanism of the present invention.

Referring now to FIG. 1, a gear transmission 10 itself is the same as a conventionally known gear transmission as illustrated in FIG. 3, and therefore detailed explanations concerning the construction and operation thereof will not be necessary.

A power input shaft 11 is rotatably supported in a casing 13 of the gear transmission 10 by means of bearings 12. An input gear 14 is connected to or integrally formed with the rear end of the power input shaft 11. The power input shaft 11 and the input gear 14 are provided therein with a stepped axial bore 15 in which output pilot bearing 16 is concentrically disposed. The output pilot bearing 16, which consists of a roller bearing, rotatably and concentrically supports a power output shaft 17 at the front end thereof with respect to the input gear 14. The input gear 14 is provided with an axially abutting gear piece 18 arranged concentrically therewith and rigidly secured thereto.

Figure 2:
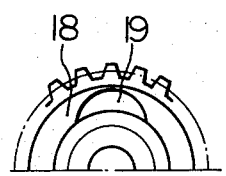
FIG. 2 is a cross-sectional view taken along line II—II in FIG. 1 and illustrating a cavity of a gear piece.

According to the present invention, the gear piece 18 has at least one cavity 19 at the side thereof adjacent to the input gear 14. Cavity 19 radially extends inwardly from the inner position of the root cylinder of the gear piece 18 to the position beyond the root cylinder of the input gear 14 (FIGS. 1 and 2). A space is thus defined between the input gear 14 and the gear piece 18 by cavity 19. The input gear 14 is formed with at least one oil aperture 21 which connects between the above mentioned space and the output pilot bearing 16. The oil aperture 21 is radially inclined and extends from the portion of the input gear 14, which is adjacent to the gear piece 18 and is the inner side of the root cylinder of the input gear 14, to the output pilot bearing 16.

Cavity 19 and an aperture 21 are formed by machining. The machining takes place before the gear piece 18 is rigidly or integrally connected to the input gear 14. After being machined, the gear piece 18 is rigidly fitted with respect to the output gear 14 so that one or more cavities 19 are placed in the positions corresponding to one or more oil apertures 21.

The power input shaft 11 is provided with an air communication port 24 which connects between the interior of the bore 15 and the outside thereof, that is to say, the inside space of the casing 13 of the gear transmission 10. In FIG. 1, reference numeral 22 indicates a counter shaft, and 23 indicates a counter input gear which is rigidly secured to the counter shaft 22 and is in constant meshing engagement with the input gear 14.

When the power input shaft 11 is rotated, the input gear 14 and the counter input gear 23 which are in constant engagement with each other, are rotated and thus the counter shaft 22 is also rotated. Due to the rotation of these gears 14 and 23, the lubrication oil contained in the casing 13 of the gear transmission 10 is raised up and the oil, especially in the spaces between the teeth of the gears 14 and 23, is urged to the space defined by cavity 19 with the help of the pushing pressure of the root cylinder portions of the gears 14 and 23. The oil is then supplied through the oil aperture 21 to the output pilot bearing 16. The pressure in the bore 15 is apt to be raised due to the oil flow. However, the air in bore 15 is released through the air communication port 24 to the outside thereof (inside space of the casing 13) so that the pressure in bore 15 is prevented from being excessively raised.

In the embodiment illustrated in FIG. 1, both the input gear 14 and the counter input gear 23 are helical gears as shown and, looking from the front, that is to say, from the left side of the drawing, the input gear 14 rotates in the clockwise direction and the counter input gear 23 rotates in the counter clockwise direction, so that the oil in the teeth spaces is effectively urged to the rightward and supplied into cavity 19. However, even if these gears were spur gears, some effects mentioned above could have been obtained due to the pushing pressure created in the teeth spaces.

What is claimed is:
1. A bearing lubrication mechanism of a gear transmission, comprising:
 (a) a casing containing lubrication oil;
 (b) an input power shaft rotatably mounted in said casing having an axial bore in one end thereof;
 (c) an input gear having a root cylinder concentrically and integrally formed with said input power shaft at said one end thereof;
 (d) an output power shaft one end thereof being coaxially disposed in the axial bore of said input power shaft;
 (e) an output pilot bearing disposed in said axial bore and rotatably supporting the one end of said output power shaft;
 (f) a gear piece having a root cylinder rigidly secured to and disposed concentrically and in axial abutting relationship with said input gear at the one end of said input power shaft, the root cylinder of said gear piece being radially larger than the root cylinder of the adjacent input gear and having at least one cavity opening toward said input gear and radially extending from the radial inward portion of the gear piece root cylinder to a position radially outward of the root cylinder of said input gear; and
 (g) the root cylinder of said input gear having at least one radially inclined oil aperture providing oil communication between the space defined by said cavity and said axial bore proximate said pilot bearing, and said input power shaft having at least one air communication port connecting said axial bore with the space defined by said casing.

* * * * *